March 7, 1967  J. T. GILBERT  3,307,784
PROGRAM TEMPERATURE CONTROLLING APPARATUS
Filed March 3, 1965
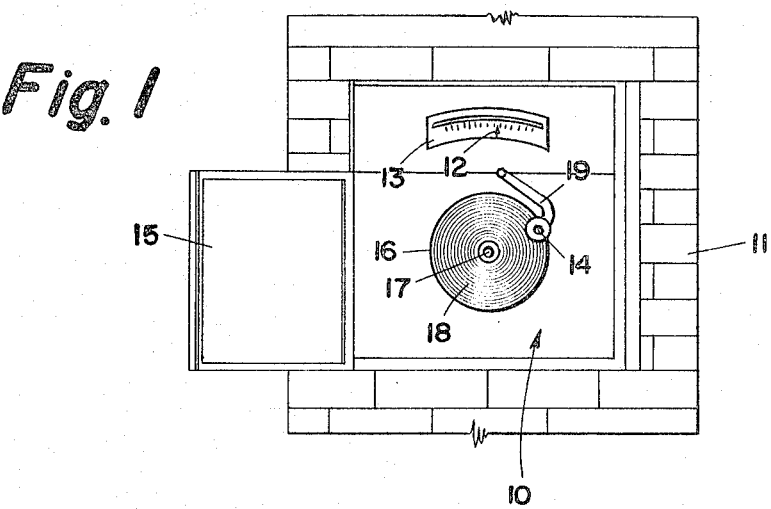
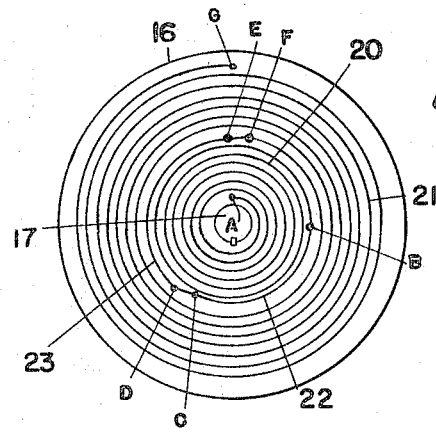
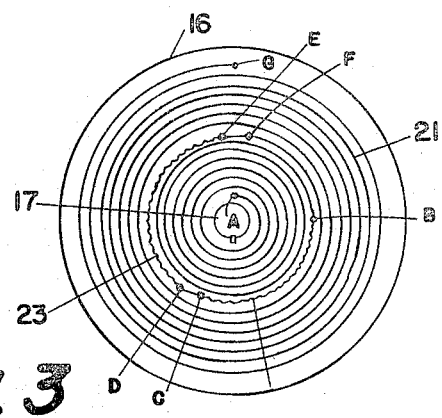
INVENTOR.
JOSEPH T. GILBERT
ATTORNEYS 3,307,784
PROGRAM TEMPERATURE CONTROLLING
APPARATUS
Joseph T. Gilbert, 505 Robbins Ave.,
Philadelphia, Pa. 19111
Filed Mar. 3, 1965, Ser. No. 436,967
1 Claim. (Cl. 236—46)

The invention described herein may be manufactured and used by or for the Government for governmental purposes without the payment to me of any royalty thereon.

This invention relates to controller means, and more particularly, to means for controlling the temperature in a heat treatment system.

The primary object of the invention is to provide means for precisely controlling temperature at predetermined conditions over predetermined periods of time.

Another object of the invention is to provide such precision temperature controlling means which continuously operates over unusually long periods of time.

A further object of the invention is to provide such precision temperature control means which operates with extreme accuracy to produce minutely fluctuating, predetermined temperature conditions.

In one aspect of the invention a control cam is provided in the form of a rotatably mountable member having a surface thereof provided with a substantially spirally shaped camming groove for engagement by a controlling cam follower.

In another aspect of the invention the camming groove includes a plurality of spiral shaped groove portions providing points along the groove of relative uniformly increasing incremental distances from a predetermined point on the cam, the spiral portions being interconnected by at least one groove portion varying from the uniformly increasing increments.

These and other objects, features and advantages will become apparent from the following description and accompanying drawing in which:

FIG. 1 is an elevational view of a controlled heat treating arrangement embodying the principles of the invention.

FIG. 2 is an enlarged view of the control cam in the FIG. 1 arrangement.

FIG. 3 is a modification of the cam shown in FIG. 2.

Referring to FIG. 1, the precision heat treating furnace 11, within which curing, annealing, and other heat treatment operations may be performed upon cast or other material, includes means (not shown) for delivering heat as called for by or in response to the relative temperature differential within the furnaces and that called for by thermostatic control indicating element 12 upon its stationary dial or indicia scale 13. Indicating element or pointer 12 is suitably connected to the cam follower 14 for responsive movement along scale 13 to indicate the thermostatic temperature requirement prescribed by the cam follower 14 of the control unit, shown generally at 10, which preferably is provided with a hinged door 15 and appropriately mounted adjacent the furnace 11. The control cam 16 is mounted upon a rotatable, motor driven shaft 17 and has provided on at least one of its faces or surfaces an elongated substantially spirally shaped groove 18 of multiple revolutions or helical turns. The cam follower or pin 14 extends through its arm 19 and is operatively receivable in camming groove 18.

As seen in FIGS. 2 and 3, the contour of groove 18 on cam disc 16 is preferably formed with a plurality of spiral shaped groove portions 20 and 21. Preferably, each spiral groove portion 20, 21 provides points along groove 18 of relative uniformly increasing incremental distances from the center of the cam. The particular cam groove 18 shown has one spiral groove portion 20 which extends in a coil-like or helical manner from points A to B and, when operatively engaged with cam follower 14 and thermostatic element 12, serves to uniformly increase the predetermined temperature requirement from 75° F. to 250° F. It is contemplated that cam 16 will be uniformly but slowly rotated to make one revolution every 24 hours, thus increasing the furnace temperature 25° every hour during the first seven days of operation. A similar constant increase in temperature is obtained from spiral groove portion 21 from points F to G over the last 7⅓ day period. Intermediate groove portions 22 and 23 are of a circular arc pattern to provide substantially steady or soaking 8 hour periods at substantially constant temperatures of 250° F. from points B to C and approximately 260° F. from points D to E. At the end of each soak period, it is preferable to rapidly increase the temperature over short periods as shown by the cam groove contour from respective points C to D and E to F. As seen in FIG. 3 the soak period groove portion 22 is provided with predetermined minute fluctuations along its path to produce extremely accurate temperature control during the soaking operation.

It is to be observed that it may be preferable to only employ partial uses of the camming groove 18, that a reversible motor could be employed to produce accurately controlled reductions in temperature, and that if only a uniform change in temperature is desired over long periods of controlled operation, spiral groove portions 20 and 21 may be contiguously formed without having intermediate groove portions that vary from the uniformly increasing increments thereof.

Various modifications, alterations or changes may be resorted to without departing from the scope of the invention as defined by the appended claim.

I claim:
In a heat treatment system having heat producing means and temperature program means for controlling said heat producing means,
the improvement which comprises:
a rotatably mounted disk having a central axis of rotation,
means for rotating said disk about said axis at a predetermined speed,
said disk having a substantially spirally-shaped camming groove on the surface of said disk, said camming groove being configured in accordance with a multi-stage temperature controlled program for said system which includes at least one constant temperature stage,
said camming groove including a plurality of spiral-shaped groove portions defining points along said groove of relatively increasing deviational radial distances from said central axis,
said spiral-shaped portions being interconnected by at least one groove portion containing points whose corresponding distances from said central axis define a reduced rate of deviation for said constant temperature stage of said program,
said reduced rate groove portion points being in a substantially circular arc and radially substantially equidistant from said central axis, and a cam follower engaging said camming groove and operatively connected with said heat producing means for controlling the temperature of said system through a plurality of stages in response to the temperature controlled program of said camming groove.

References Cited by the Examiner

UNITED STATES PATENTS

| | | | |
|---|---|---|---|
| 504,086 | 8/1893 | Johnson | 74—567 X |
| 1,430,852 | 10/1922 | Roesch | 236—46 |
| 1,499,278 | 6/1924 | Wingfield | 236—46 |
| 2,262,732 | 11/1941 | Gruber | 274—13 |
| 2,775,460 | 12/1956 | Shivack | 274—42 X |

FOREIGN PATENTS

| | | |
|---|---|---|
| 880,523 | 1/1943 | France. |
| 972,281 | 10/1964 | Great Britain. |

WILLIAM J. WYE, *Primary Examiner.*

ALDEN D. STEWART, *Examiner.*